(12) United States Patent
Chang et al.

(10) Patent No.: US 10,600,194 B2
(45) Date of Patent: Mar. 24, 2020

(54) IMAGE AND VIDEO CAPTURE ARCHITECTURE FOR THREE-DIMENSIONAL RECONSTRUCTION

(71) Applicant: General Electric Company, Schenectady, NY (US)

(72) Inventors: Ming-Ching Chang, Clifton Park, NY (US); Junli Ping, Clifton Park, NY (US); Eric Michael Gros, Waukesha, WI (US); Arpit Jain, Niskayuna, NY (US); Peter Henry Tu, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 61 days.

(21) Appl. No.: 15/685,867

(22) Filed: Aug. 24, 2017

(65) Prior Publication Data
US 2019/0066317 A1 Feb. 28, 2019

(51) Int. Cl.
| | |
|---|---|
| *G06T 7/55* | (2017.01) |
| *G01C 11/02* | (2006.01) |
| *G05D 1/00* | (2006.01) |
| *G06T 17/00* | (2006.01) |
| *G06T 7/521* | (2017.01) |
| *G05D 1/10* | (2006.01) |
| *G06T 5/00* | (2006.01) |
| *G06T 7/00* | (2017.01) |
| *G08G 5/00* | (2006.01) |

(Continued)

(52) U.S. Cl.
CPC .............. *G06T 7/55* (2017.01); *G01C 11/02* (2013.01); *G05D 1/0094* (2013.01); *G05D 1/101* (2013.01); *G06T 5/002* (2013.01); *G06T 7/001* (2013.01); *G06T 7/521* (2017.01); *G06T 17/00* (2013.01); *G08G 5/0039* (2013.01); *G05D 2201/0207* (2013.01); *G06T 15/205* (2013.01); *G06T 2200/04* (2013.01); *G06T 2200/08* (2013.01); *G06T 2207/10028* (2013.01); *G06T 2207/10032* (2013.01); *G06T 2215/16* (2013.01); *H04L 67/12* (2013.01)

(58) Field of Classification Search
CPC G06T 7/55; G06T 5/002; G06T 7/521; G06T 17/00; G06T 7/001; G06T 15/205; G06T 2200/04; G06T 2207/10028; G06T 2215/16; G06T 2200/08; G06T 2207/10032; G01C 11/02; G08G 5/0039; G05D 1/101; G05D 1/04; G05D 2201/0207; H04L 67/12
See application file for complete search history.

(56) References Cited

U.S. PATENT DOCUMENTS

| | | | |
|---|---|---|---|
| 2013/0317667 A1* | 11/2013 | Kruglick | B64C 39/024 701/2 |
| 2015/0117786 A1* | 4/2015 | James | G06F 16/51 382/195 |

(Continued)

*Primary Examiner* — Qian Yang
(74) *Attorney, Agent, or Firm* — Fletcher Yoder, P.C.

(57) ABSTRACT

The present approach relates to an automatic and efficient motion plan for a drone to collect and save a qualified dataset that may be used to improve reconstruction of 3D models using the acquired data. The present architecture provides an automatic image processing context, eliminating low quality images and providing improved image data for point cloud generation and texture mapping.

17 Claims, 5 Drawing Sheets

(51) Int. Cl.
G06T 15/20 (2011.01)
H04L 29/08 (2006.01)

(56) References Cited

U.S. PATENT DOCUMENTS

2017/0192424 A1* 7/2017 Poole .................... H04N 7/183
2017/0208245 A1* 7/2017 Castillo ............. H04N 5/23222

* cited by examiner

IMAGE AND VIDEO CAPTURE ARCHITECTURE FOR THREE-DIMENSIONAL RECONSTRUCTION

TECHNICAL FIELD

The subject matter disclosed herein relates to creating a three-dimensional model of an object, such as an industrial, commercial, or government asset.

BACKGROUND

Various entities may own or maintain different types of assets as part of their operation. Such assets may include physical or mechanical devices, structures, or facilities which may, in some instances, have electrical and/or chemical aspects as well. Such assets may be used or maintained for a variety of purposes and may be characterized as capital infrastructure, inventory, or by other nomenclature depending on the context. For example, assets may include distributed assets, such as a pipeline or an electrical grid as well as individual or discrete assets, such as an airplane, a wind turbine generator, a radio tower, a steam or smoke stack or chimney, a vehicle, and so forth. Assets may be subject to various types of defects (e.g., spontaneous mechanical defects, electrical defects as well as routine wear-and-tear) that may impact their operation. For example, over time, the asset may undergo corrosion or cracking due to weather or may exhibit deteriorating performance or efficiency due to the wear or failure of component parts.

Typically, one or more human inspectors may inspect, maintain, and repair the asset. For example, the inspector may locate corrosion on the asset, may locate and quantitatively or qualitatively assess cracks or defects on the asset, may assess an asset for the degree of wear-and-tear observed versus what is expected, and so forth. However, depending on the location, size, and/or complexity of the asset, having one or more human inspectors performing inspection of the asset may take away time for the inspectors to perform other tasks or may otherwise be time consuming and labor intensive, requiring personnel time that might be more productively spent elsewhere. Additionally, some inspection tasks may be dull, dirty, or may be otherwise unsuitable for a human to perform. For instance, some assets may have locations that may not be accessible to humans due to height, confined spaces, or the like. Further, inspections may be performed at times that are based on schedules resulting in either over-inspection or under-inspection.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible embodiments. Indeed, the invention may encompass a variety of forms that may be similar to or different from the embodiments set forth below.

In one embodiment, a method is provided for inspecting an asset. In accordance with this method, one or more drones are controlled to execute a flight plan with respect to the asset. The flight plan initially specifies a set of geometric poses about the asset from which image data is to be acquired. A first set of image data of the asset is acquired at a first resolution at each geometric pose. Sufficiency of the first set of image data is determined with respect to a three-dimensional (3D) model reconstruction process. Based on a determination that the first set of image data is unsuitable for 3D model reconstruction, one or more additional sets of image data are acquired based on one or more problems identified in the first set of image data. Sufficiency of the first set of image data combined with the one or more additional sets of image data is determined with respect to the three-dimensional (3D) model reconstruction process. A 3D model is reconstructed when the first set of image data combined with the one or more additional sets of image data are determined to be suitable for 3D model reconstruction.

In a further embodiment, an image analysis system is provided. In accordance with this embodiment, the image analysis system includes one or more processors configured to execute routines and a memory storing one or more non-tangible, processor executable routines. When executed by the one or more processors, the stored routines cause acts to be performed comprising: controlling one or more drones to execute a flight plan with respect to the asset, wherein the flight plan initially specifies a set of geometric poses about the asset from which image data is to be acquired; acquiring a first set of image data of the asset at a first resolution at each geometric pose; determining sufficiency of the first set of image data with respect to a three-dimensional (3D) model reconstruction process; based on a determination that the first set of images is unsuitable for 3D model reconstruction, identifying sub-regions of the asset corresponding to unsuitable or insufficient image data; acquiring one or more additional sets of image data of the sub-regions by having the drone re-execute the flight plan or an updated flight plan; determining sufficiency of the first set of image data combined with the one or more additional sets of image data with respect to the three-dimensional (3D) model reconstruction process; and reconstructing a 3D model when the first set of image data combined with the one or more additional sets of image data are determined to be suitable for 3D model reconstruction.

In an additional embodiment, a method is provided for imaging a surface of an asset. In accordance with this method, one or more drones are controlled to execute a flight plan with respect to the asset. The flight plan initially specifies a set of geometric poses about the asset from which image data is to be acquired. For one or more surfaces of the asset, a visual pattern is projected onto the respective surface to create a temporarily patterned surface. Two or more images of the temporarily patterned surface are acquired. Features present in the two or more images are matched. At least a portion of the features matched correspond to regions of the projected pattern.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As discussed herein, the present approach relates to generating three-dimensional (3D) models of objects using various approaches that may be used in conjunction with one another or separately. Such 3D models may be useful in an inspection context, including inspections performed using unmanned vehicles or drones and/or inspections implemented by automated or computer-based routines. In particular, such 3D models may be generated using information acquired using such inspection sources and may then be compared to known or expected models to identify potential fault regions or areas deserving additional or follow-up review.

By way of example, such inspections may be performed using unmanned or robotic devices, such as unmanned aerial vehicles (UAVs), unmanned submersible vehicles (USVs), or other autonomously moving vehicles that may be characterized as drones or robots. For simplicity, to the extent the term "drone" is used herein, though it should be appreciated that this terminology is intended to encompass all variations, of UAVs, USVs, robotic devices, and so forth that are capable of programmable movement with no or limited human oversight. Such programmable movement can be based on either locally generated path waypoints or guidance or path guidance and waypoints generated by a remote system and communicated to the drone. Thus, as used herein, such devices move during an operational phase or period entirely or primarily without direct human intervention or control and/or with limited human intervention or oversight. In accordance with present approaches, such devices may be operated to move along a flight plan, along which the devices acquire inspection data, such as video or still image data, LIDAR data, or other data that can be acquired by sensors or cameras that can be affixed to a device moving along the flight plan. In general, such inspections may be performed on one or more assets including, but not limited to, power generation assets, communication assets, transportation assets, mining or underground pumping assets, manufacture or construction assets and so forth.

Though the phrase "flight plan" is used generally herein, it should be appreciated that this phrase does not necessitate aerial movement, but instead relates to any one-dimensional (1D) (such as along a track), two-dimensional (2D) (such as along a defined or undefined planar route), or three-dimensional (3D) (such as movement in the air, under water, or on a structure in where depth or altitude is also traversable), or four-dimensional (4D) (such as where there are defined temporal aspects) path or route along which a drone moves as part of an inspection plan. Thus, a "flight plan" as used herein may be characterized as any 1D, 2D, 3D, or 4D route or path along which device such as a drone or robot is moved to perform a sensor-based inspection of an asset. Such a path may be adaptive, as discussed herein, and may consist of one or more waypoints along which the drone proceeds in an ordered fashion, with the sequence and location of the waypoints defining the path or route. It should be appreciated that such a flight plan may also incorporate not only temporal and/or spatial locations, but also orientation and/or alignment instructions for movement along the path and/or to exhibit at a given waypoint. Thus, the flight plan may also specify parameters such as roll, pitch, and yaw for the drone to exhibit at different points along the flight plan as well as two- or three-dimensional alignment characteristics that may relate to the direction in which a sensor or camera is pointing at a point along the flight plan. Thus, the flight plan may address not only where or when a drone is with respect to an inspection site but, at a given location or waypoint, the direction the drone is facing or otherwise oriented with respect to. Further, even at the same waypoint and orientation, images may be acquired at different magnifications, wavelengths, or other optical parameter such that effectively the image constitutes a different view.

As discussed herein, the present approach facilitates the inspection of assets by allowing generation of a 3D model or representation of an asset based on acquired sensor data gathered during an inspection. Operational data for the asset may be incorporated into planning or adapting the flight plan so as to facilitate inspection or visualization of the asset at certain operational phases or moments.

With the preceding in mind, various aspects of the present approach may facilitate or improve the process of generating a 3D model. For example, in certain aspects, a robotic device, such as a drone, may be at least partially controlled during an inspection or acquisition phase based on a visual feedback loop. By way of example, an approach may be employed in which progressively higher resolution data is acquired. In such an approach, visual feedback may be used to provide some degree of path guidance. Similarly, motion sensing and motion correction that may contribute to blur may be performed as part of this or other processes.

In further aspects, an active lighting approach may be employed as part of the process of acquiring visual data and/or generating a 3D model. By way of example, a pattern or other visual construct may be projected onto a surface undergoing imaging to aid in feature matching, which may be beneficial in certain contexts, such as point cloud generation for an otherwise featureless region or surface. Similarly, structured light may be used as part of a 2D or 3D measurement process with respect to such surfaces.

In addition, in accordance with certain aspects, prior knowledge may be leveraged in the inspection process. For example, prior knowledge may be used in generating or modifying an adaptive flight plan, such as to resolve issues related to missing data. In certain aspects, machine learning approaches may be employed to learn from human reviewer decisions to re-image based on image quality or data sufficiency, thereby creating a trained artificial neural network based on this prior knowledge that can facilitate future data sufficiency decisions.

To facilitate explanation and provide useful real-world context, various examples such as wind turbine generators, radio transmission towers, smokestacks, and so forth are provided herein. It should be appreciated however that such examples are provided merely to facilitate explanation, and the present approach is suitable for use with a wide range of other assets and at various other types of sites. Thus, the present approach is not intended to be limited to the context of the present examples.

Figure 1:
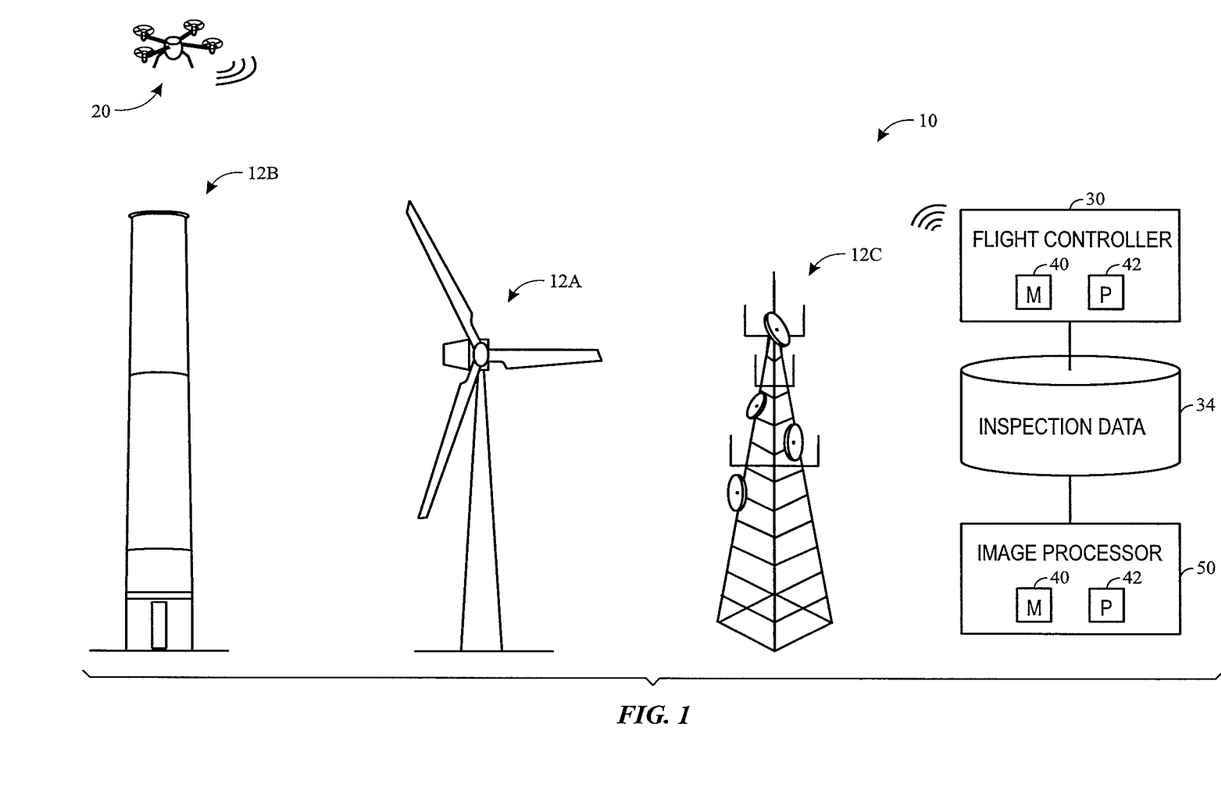
FIG. 1 shows various types of assets suitable for inspection and modeling, in accordance with aspects of the present disclosure.

With the preceding in mind, and turning to the figures, FIG. 1 depicts aspects of a system 10 employing one or more drones 20 suitable for inspecting one or more assets 12, such as a wind turbine generator 12A, radio tower 12C, smokestack 12B, or other suitable asset.

FIG. 1 also depicts a flight controller 30 that is responsible for coordinating operation of one or more drones 20, such as for inspection of an asset 12. In one embodiment, the drone(s) 20 have onboard cellular or network connectivity and can communicate with the flight controller 30 at least prior to beginning an inspection. In certain implementations the cellular or network connectivity of the drone(s) 20 allow communication during an inspection, allowing inspection data to be communicated to the flight controller 30 or other components (e.g., inspection data repository 34) and/or allowing the flight controller to communicate changes to the flight plan to a given drone 20. Alternatively, changes to the flight plan may be determined by a processor internal to the drone 20, i.e., onboard, such as in the event the drone 20 is operating outside of communication range from the flight controller 30.

In the depicted example, the flight controller 30 is depicted as a processor-based system having a one or more processors 40 and a memory 42. For example, the processor 40 may execute routines stored in the memory 42 (and/or utilize data stored in the memory 42) to generate commands or flight plans for the drone(s) 20 used in an inspection process.

In the depicted example the flight controller 30 is depicted as in communication with an inspection data database 34, such as an image repository. By way of example, videos, images, LIDAR data, depth sensor data, or other relevant sensor or camera data acquired by the one or more drones 20 during an inspection may be uploaded to the inspection data database 34 as acquired or as a batch after an inspection flight plan is completed. Alternatively, in other implementations the inspection data may be provided to the database 34 by other means or channels, such as via direct transmission from the drone 20 and/or via other intermediary communication structures, such as a dedicated inspection data communication circuit operating independent of the flight controller.

The data within the inspection data database 34 may be used to generate a 3D model as discussed herein, which may in turn be reviewed or validated as part of the inspection process. In certain implementations, a 3D model may be generated and assessed in real time or near-real-time, in which case the flight controller 30 may on-the-fly update the flight plan of a drone 20 if acquisition of additional inspection data is warranted (e.g., additional video or images from a different range or angle). The 3D model may be generated using processes described herein using processing components 40 of the flight controller and/or of an image processing system 50 having access to the inspection data 34 are used to generate a 3D model of the asset 12.

In the depicted example, the flight controller 30, inspection database 34, and image processor 50 are depicted as separate and discrete entities. However, it should be appreciated that, depending on the implementation, certain of these aspects may be provided as different functions or functionalities implemented by a single or common processor-based system. Conversely, the depicted functionalities may be implemented in a distributed or dispersed manner, with certain aspects being local to the asset 12, to the drone control or operational facility and/or other locations remote from the asset 12. In such distributed implementations, the depicted aspects may still be communicatively linked, such as over one or more network connections.

As discussed herein, as part of an asset inspection process, it may be useful to generate a model, such as a 3D model, of the inspected object using the acquired inspection data, such as video or image data.

With the preceding features in mind, in a first aspect the present approach improves the visual scanning of an asset using a visual feedback process. For example, turning to FIG. 2, In one implementation an initial flight plan 80 may exist which when executed (step 84) controls the operation of a drone inspecting an asset, such as specifying the locations traveled to be the drone, the time spent at each location (e.g., waypoint), the sensor data (e.g., image or video data, LIDAR data, and so forth) of the asset acquired at some or all of the locations, including the geometric pose (i.e., location and orientation) of the sensor associated with each acquisition. The initial flight plan 80 may be generated or adapted based on prior knowledge, such as knowledge of particular details of a given asset (e.g., known issues or prior inspection concerns), knowledge of the terrain or environment specific to an asset, knowledge of weather or other environmental conditions at the time of an inspection of an asset and so forth, knowledge of known data issues or missing data with respect to an asset, and so forth.

Figure 2:
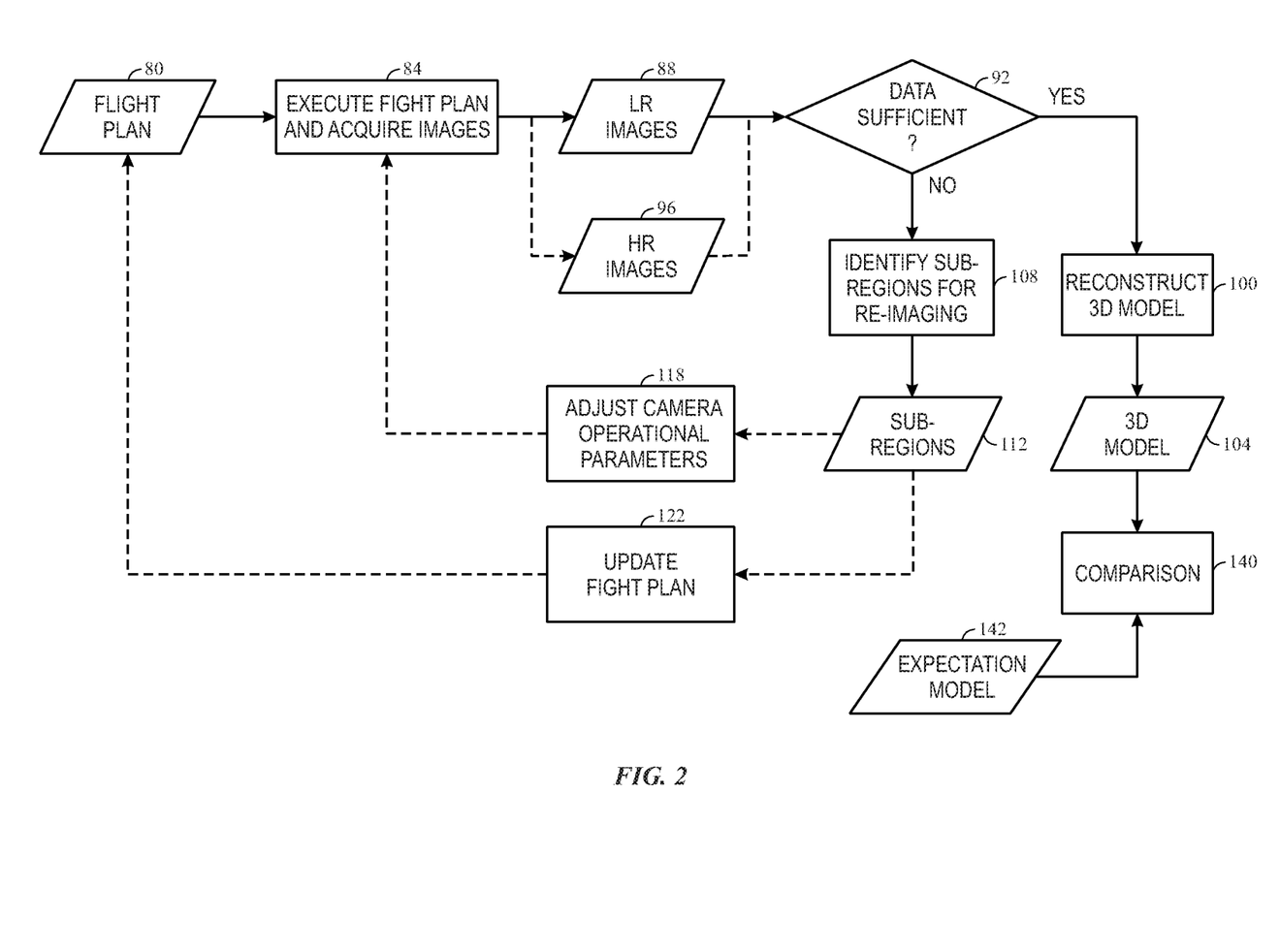
FIG. 2 depicts a process flow corresponding to a visual feedback control loop for collection of inspection data, in accordance with aspects of the present disclosure.

In the depicted example, the initial flight plan 80 may specify a set of lower resolution (LR) images 88 are acquired initially. Alternatively, the initial flight plan may envision that LR images 88 are acquired initially followed by a set of higher resolution (HR) images being acquired at the same or different waypoints.

In the depicted example, a feedback control loop is implemented where the sufficiency of the image data is evaluated at block 92, either using processing components and routines executed on the drone and/or remotely. As may be appreciated, sufficiency of the image data may be performed using various algorithms and/or quantitative approaches. By way of example, in one implementation data sufficiency may be assessed from an information availability perspective. For example, assuming a photogrammetry embodiment is employed, a given point must be seen from some minimum number of unique perspectives to be able to triangulate it's location. But more angles lead to a more accurate estimation. Therefore, in such an approach it may be possible to build a preliminary model, and for each point along the proposed surface, estimate the number of unique views of that point. If that number is below a certain threshold, then a new path, i.e., flight plan, could be planned to capture more perspectives of the under-defined point based on the current conceptualization of the object. In some instances, the preliminary model may reveal or otherwise indicate that an object or structure that was not anticipated in the original flight path planning is impairing visibility of structures or features of the asset, i.e., is blocking the view of portions of the asset.

Such approaches may also be considered from a probabilistic standpoint, such that a confidence or uncertainty may be estimated for some or all of the portions of an imaged surface. In such a context, if the uncertainty is above a specified threshold, that may trigger the collection of additional information, i.e., more or higher resolution views.

Similarly, from an information availability perspective, sufficiency of the image data may be based on density of correspondence points (assuming once again a photogrammetry approach). If there is a portion of a given surface with low point density (i.e., below a specified point density threshold or outside a specified context specific range), collection of additional view may be triggered of the respective area and/or alternative approaches may be employed to enable creation of more correspondences (e.g., projecting a texture or pattern on the surface, and so forth).

In other implementations, sufficiency of image data may be estimated or assessed based on deviation from an expectation, such as based on expectations generated from a pre-existing model of the object (e.g., engineering CAD models, prior scans, and so forth). Such expected values may be compared to a preliminary model created from a first-pass data collection. For those portions of the expectation model and the preliminary model that differ, collection of more information may be indicated. In such a context, such differences may be an indication that either the first pass information was insufficient to create an accurate model (that is, the deviation is artificial) or that there is a true deviation which will likely be of interest during follow-up analysis. Thus, in either instance the collection of additional data is warranted in order to obtain as much information and/or detail as possible.

In the event that the image data (or other sensor data) is deemed sufficient for 3D reconstruction, the data may be used to subsequently reconstruct (step 100) a 3D model 104 of the asset which may be used as part of an inspection process, such as being reviewed by an inspector or compared to a ground truth or engineering model (e.g., a CAD model) for deviations from expectation.

Alternatively, in the event that the data is not deemed sufficient, additional images, such as higher resolution images 96, may be acquired for those imaged regions (i.e., sub-regions 112) where the image data is deemed insufficient, such as may be identified at step 108. In one example, the acquisition of additional images may be in accordance with an octree-based algorithm, in which a given volume for which additional data is to be acquired is subdivided into eight equivalent sub-volumes 112 (e.g., subdividing a cube into eight sub-cubes), each of which are then imaged or otherwise sensed. However, more generally, areas of data insufficiency are identified (step 108) and algorithmically parsed into sub-regions 112 for which more detailed or higher-resolution data is to be acquired.

Based on the identified sub-regions, one or both of updating (step 122) the flight plan 80 and/or adjusting (step 118) camera operational parameters (e.g., focal length, exposure, and so forth) may be performed as part of additional data or image acquisition. For example, based on the sub-regions 112 to be re-imaged, the flight plan 80 may be updated to move the drone into position to acquire image data of sufficient detail or resolution and from the specified geometric poses (e.g., orientation, location, distance, and so forth). Execution of the updated flight plan 80 then results in acquisition of higher resolution images 96 that can then be evaluated for sufficiency (block 92) as part of the feedback loop.

Alternatively, in the depicted example the initial plan can be re-executed but using camera parameters (e.g., exposure, focal length, and so forth) that result in higher resolution images 96 being acquired for the sub-regions 112. In practice, acquisition of the higher resolution images 96 may involve both adjusting the flight plan and re-parameterizing the camera.

As may be appreciated, the depicted visual feedback loop may be useful in a variety of circumstances. By way of example, an initial flight plan 80 may be expected to be sufficient, but due to inclement weather, low light at the time of image acquisition, degradation or dirtiness of the asset, and so forth, the initial images may be insufficient for the inspection purpose or model building. Likewise, unexpected damage or degradation of the asset may warrant additional data collection at higher resolutions or of particular regions of the asset. Such a need for additional data collection may be determined from the image data itself or, as shown, by a subsequent comparison (step 140) of a 3D model 103 generated from the acquired images to a known or expected representation 142.

In this manner, image or other sensor data may be used as part of an inspection feedback loop so that, during a single inspection visit by a drone or set of drones, complete or sufficient inspection data is acquired, without additional, subsequent trips being needed in the event the acquired data is insufficient.

In a further aspect, as part of the real-time inspection process, poor or problematic images that would negatively impact the reconstruction (step 100) of the 3D model 104 may be identified and removed, either as part of a feedback loop as shown in FIG. 2 or as a standalone process for improving the model reconstruction process. By way of example, images acquired by a drone as part of an inspection may be filtered out if they do or would negatively impact the 3D reconstruction process. Examples of such problematic images may include, but are not limited to, images that are under or overexposed, images having sensor artifacts, images having improper depth of field, and/or images exhibiting deformation. Such images may be detected and discarded due to their information loss and feature disappearance. In one implementation, such filtering of images applies to raw image output directly from the camera to preserve the original quality.

As may be appreciated, such an image filtering aspect may be incorporated with the feedback process discussed with respect to FIG. 2. For example, image filtering may be incorporated into the data sufficiency determination, with poor or problematic images filtered and removed prior to or as part of the data sufficiency determination at step 92. In such an example, the filtered images may result in a determination of data insufficiency, leading to additional higher quality or higher resolution images being obtained in place of the poor or problematic images as outlines in the discussion of FIG. 2. Thus, in this example, a poor image or one that does not contribute to, or even detracts from, the 3D model reconstruction can be filtered out and replaced with a higher quality or higher resolution image until data sufficiency is met.

In a further aspect, a motion sensor may be incorporated into the image acquisition and inspection process to allow for motion correction and/or rejection of images exhibiting motion effects (e.g., blur). In such an implementation, the asset structure may be configured with a motion sensor to detect and communicate motion of the structure and/or may be configured with a visual pattern or other discernible feature which, when in focus and imaged, may be compared to a reference to identify indications of motion in the images, such as blur effects. Similarly, the drone itself may configured with a motion sensor, as unexpected motion of the drone or asset can lead to motion effects in the images that may detract from a 3D model being generated of the asset.

In certain implementations, the motion sensed or determined using such approaches may be quantified in magnitude and direction. The motion blur (or other motion effects) can then be corrected ad hoc in the image data to improve a 3D model generated using the motion corrected images. Alternatively, turning back to FIG. 2, detection of motion in an image may be a factor considered in the data sufficiency determination 92, which may then lead to re-imaging of the motion-affected image via the feedback loop described until a suitable image is obtained.

It may also be appreciated that visual feedback and control of a drone, as outlined above, while useful in the inspection and imaging context may have other useful contexts related to drone operation. By way of example, in a charging context, the visual collection mechanism (e.g., camera) of a drone may be used to visually identify (such as based on a pattern or visual marking on the charging station) an accessible charging station. Based upon the view of the charging station (or the pattern or marking on the charging station), couple or dock the drone to the charging station using a visual feedback control loop.

As may be appreciated, the preceding implementations relate to mechanisms for controlling or altering movement or operation of a drone based on visual feedback. In certain other aspects, discussed below, the image acquisition and inspection process may be augmented by the use of structures light or pattern projection during the image acquisition process.

Figure 3:
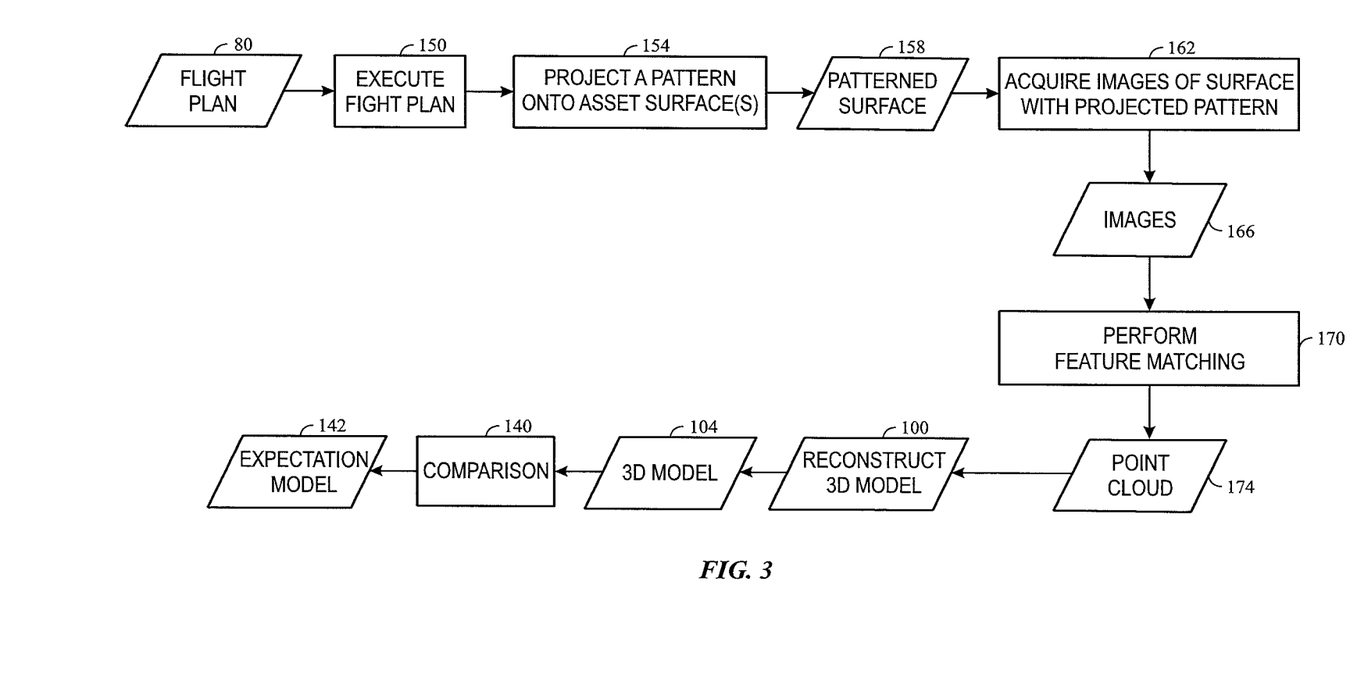
FIG. 3 depicts a process flow for the use of structured light in a feature matching implementation, in accordance with aspects of the present disclosure.

In a first implementation of such an approach, and turning to FIG. 3, a flight plan 80 for an inspection data acquisition may be executed (step 150) as discussed above. For example, motion and camera (or other sensor) operation of one or more drones may be coordinated in accordance with the flight plan 80 to acquire images or other sensor data of an asset undergoing inspection.

As shown in FIG. 3, a pattern (e.g., a visual or optical pattern) may be temporarily projected (step 154) onto one or more surface of the asset that are featureless or relatively featureless within the field of view associated with a respective image. By way of example, the pattern may be a multi-color, gray-scale, black-and-white, or simple line or curve-based pattern that when projected onto the surface, creates temporary visual features or landmarks on the surface (e.g., patterned surface 158) to allow points to be identified on the surface. It should be noted that, though the present example may imply the operation of a single drone, in practice one drone may project the pattern while remaining stationary while one or more other drones image (step 162) the surface from different locations such that the pattern projection remains stationary throughout images 166 acquired at different geometric poses. In other implementations, however, the drone projecting the pattern may also be acquiring (step 162) some or all of the images 166.

It should also be noted that the present approach may determine which surfaces of the asset to project patterns onto based on a priori knowledge, such as prior inspections or engineering renderings indicating which surfaces have too few features for feature matching. Alternatively, pattern projection may be determined on the fly, such as in accordance with a visual feedback loop as shown in FIG. 2 and/or image filtering, as discussed above. In such an implementation, an image, when acquired, may be evaluated for some threshold number of discernible features. If the image has insufficient features, a pattern may be projected and the image or images reacquired. Alternatively, in the feedback look context, determination of the sufficiency of the image (in a feature content sense) may be determined after an initial imaging pass, and additional images acquired in a subsequent pass using a projected pattern if an image is deemed insufficient due to lack of features for feature matching. It should be noted that, as discussed in greater detail immediately below, sufficiency of features for feature matching may be determined in the context of point cloud generation, where the point cloud is used in the generation of a 3D model.

In the depicted example, the images 166, which may include images of a surface on which a pattern is projected along with images of surfaces having readily discernible features without a projected pattern, undergo a feature matching process 170 to generate a three-dimensional point cloud 174 of matched features. In such an example, some or all of the matched features may correspond to regions or portions of the projected pattern visible on the respective surface. In one implementation an existing CAD model may be employed as a regularizer in the point cloud generation process.

The point cloud 174 may be used in the construction (step 100) of a 3D model 104. As noted above, in the inspection context, the 3D model may be compared to some expected model value, such as a ground truth model, engineering model, or a previously generated 3D model from a prior inspection. As noted above, in certain circumstances, the outcome of such a comparison may involve reacquisition of one or more images in a feedback context, and in the present example reacquired images may be of a surface on which a pattern is projected to improve feature matching.

Figure 4:
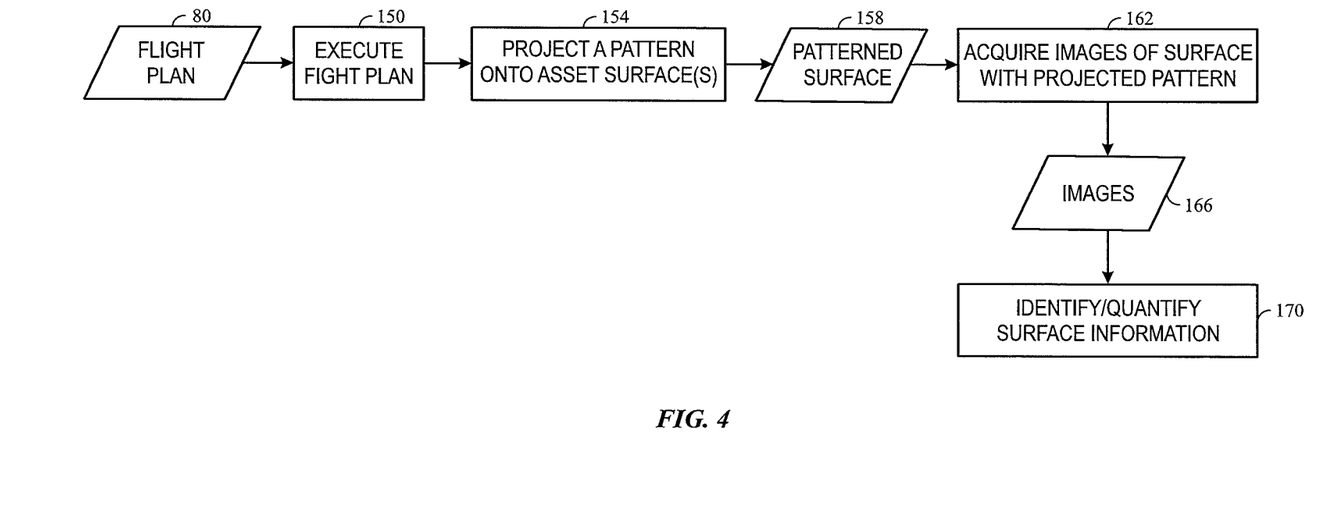
FIG. 4 depicts a process flow for the use of structured light in a surface characterization implementation, in accordance with aspects of the present disclosure.
Figure 5:
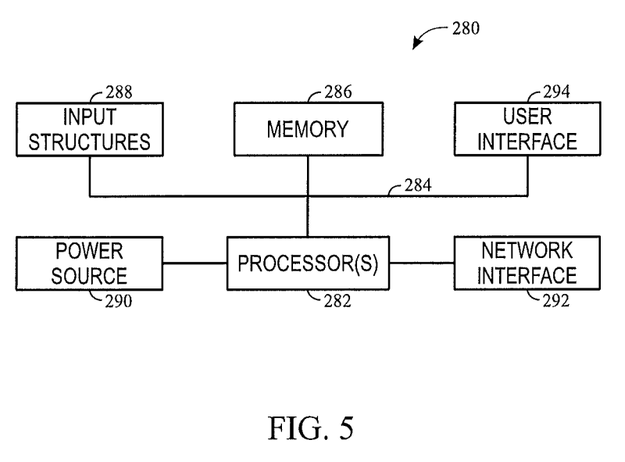
FIG. 5 is a block diagram of a computing device capable of implementing aspects of the present approach, in accordance with aspects of the present disclosure.

In a further implementation, structured light, such as a projected pattern, may be employed to directly assess an asset surface, such as to obtain 3D measurements of a surface using structure light. By way of example, and turning to FIG. 4, in one implementation a pattern may be projected (step 154) onto an asset surface to create a patterned surface 158. In this example, the pattern is a known pattern, such as a horizontal bars, vertical bars, or a grid of horizontal and vertical bars. In the depicted example, images 166 are acquired (step 162) of the surface on which the pattern is projected. Deformation of the surface may then be assessed or measured (step 170) from the images 166 based on the deformation of the known pattern in the images 166. By way of example, based on the observed deformation of the known pattern, depth and/or other surface information related to the patterned surface 158 may be assessed over the surface as a whole or at specific locations on the surface. In some implementations, deformation estimation may be with respect to a CAD or engineering design base model or representation.

As will be appreciated some or all of the preceding aspects may be performed or otherwise implemented using a processor-based system such as shown in FIG. 6. Such a system may include some or all of the computer components depicted in FIG. 6. FIG. 6 generally illustrates a block diagram of example components of a computing device 280 and their potential interconnections or communication paths, such as along one or more busses. As used herein, a computing device 280 may be implemented as one or more computing systems including laptop, notebook, desktop, tablet, or workstation computers, as well as server type devices or portable, communication type devices, such a cellular telephones, and/or other suitable computing devices.

As illustrated, the computing device 280 may include various hardware components, such as one or more processors 282, one or more busses 284, memory 286, input structures 288, a power source 290, a network interface 292, a user interface 294, and/or other computer components useful in performing the functions described herein.

The one or more processors 282 are, in certain implementations, microprocessors configured to execute instructions stored in the memory 286 or other accessible locations. Alternatively, the one or more processors 282 may be implemented as application-specific integrated circuits (ASICs), field-programmable gate arrays (FPGAs), and/or other devices designed to perform functions discussed herein in a dedicated manner. As will be appreciated, multiple processors 282 or processing components may be used to perform functions discussed herein in a distributed or parallel manner.

The memory 286 may encompass any tangible, non-transitory medium for storing data or executable routines, including volatile memory, non-volatile memory, or any combination thereof. Although shown for convenience as a single block in FIG. 6, the memory 286 may actually encompass various discrete media in the same or different physical locations. The one or more processors 282 may access data in the memory 286 via one or more busses 284.

The input structures 288 are used to allow a user to input data and/or commands to the device 280 and may include mice, touchpads, touchscreens, keyboards, and so forth. The power source 290 can be any suitable source for providing power to the various components of the computing device 280, including line and battery power. In the depicted example, the device 100 includes a network interface 292. Such a network interface 292 may allow communication with other devices on a network using one or more communication protocols. In the depicted example, the device 100 includes a user interface 114, such as a display configured to display images or date provided by the one or more processors 282.

As will be appreciated, in a real-world context a processor-based systems, such as the computing device 280 of FIG. 6, may be employed to implement some or all of the present approach, such as to receive 2D images as inputs to generate a point cloud and/or to use such a point cloud to initialize and execute a space carving operation to model an asset or object.

Technical effects of the invention include an automatic and efficient motion plan for a drone to collect and save a qualified dataset that may be used to improve reconstruction of 3D models using the acquired data. Currently, there is no automatic solution for data input optimization or correction, which may cause a large amount time and/or energy to accomplish manually. The present architecture addresses this problem in an automatic image processing context, eliminating low quality images and providing improved image data for point cloud generation and texture mapping.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for inspecting an asset, comprising:
controlling one or more drones to execute a flight plan with respect to the asset, wherein the flight plan initially specifies a set of geometric poses about the asset from which image data is to be acquired;
acquiring a first set of image data of the asset at a first resolution at each of the geometric poses;
filtering out one or more images in the first set of image data to define a filtered set of image data including fewer images than the first set of image data;
determining whether the filtered set of image data is sufficient for reconstruction of a 3D model of the asset; and
reconstructing the 3D model based on the filtered set of image data upon determining that the filtered set of image data is sufficient for reconstruction of the 3D model.

2. The method of claim 1, wherein the set of geometric poses comprises locations and orientations of the one or more drones with respect to the asset.

3. The method of claim 1, wherein the one or more drones comprise unmanned aerial vehicles, unmanned submersible vehicles, or other autonomously moving vehicles.

4. The method of claim 1, further comprising:
acquiring one or more additional sets of image data of the asset upon determining that the filtered set of image data is insufficient for reconstruction of the 3D model;
determining whether the filtered set of image data combined with the one or more additional sets of image data is sufficient for reconstruction of the 3D model; and
reconstructing the 3D model based on the filtered set of image data and the one or more additional sets of image data upon determining that the filtered set of image data combined with the one or more additional sets of image data is sufficient for reconstruction of the 3D model.

5. The method of claim 4, wherein acquiring the one or more additional sets of image data comprises:
identifying sub-regions of the asset;
updating the flight plan to generate an updated flight plan having a set of supplemental geometric poses for imaging the sub-regions; and
executing the updated flight plan via the one or more drones to acquire the one or more additional sets of image data.

6. The method of claim 5, wherein at least a portion of the one or more additional sets of image data are at a higher resolution than the first set of image data.

7. The method of claim 4, wherein acquiring the one or more additional sets of image data comprises:
identifying sub-regions of the asset;
adjusting one or more camera operational parameters;
executing the flight plan or an updated flight plan via the one or more drones for imaging the sub-regions; and
generating the one or more additional sets of image data using the adjusted camera operational parameters.

8. The method of claim 1, wherein sufficiency of the filtered set of image data is determined in view of the 3D model generated using the filtered set of image data.

9. The method of claim 1, wherein the filtered set of image data is determined to be sufficient for reconstruction of the 3D model upon determining that given points along the asset are imaged from a minimum number of different perspectives in the filtered set of image data.

10. The method of claim 1, wherein the one or more images filtered out of the first set of image data are images that are underexposed, overexposed, exhibit artifacts, have improper depth of field, or exhibit deformation.

11. The method of claim 1, further comprising:
identifying one or more particular images exhibiting motion effects in the first set of image data; and
determining one or both of a motion effect direction or magnitude; and
correcting the motion effects based on one or both of the motion effect direction or magnitude.

12. An image analysis system, comprising:
one or more processors configured to execute routines;
a memory storing one or more non-tangible, processor executable routines, which, when executed by the one or more processors, cause acts to be performed comprising:
controlling one or more drones to execute a flight plan with respect to an asset, wherein the flight plan initially specifies a set of geometric poses about the asset from which image data is to be acquired;
acquiring a first set of image data of the asset at a first resolution at each of the geometric poses;
filtering out one or more images in the first set of image data to define a filtered set of image data including fewer images than the first set of image data;
determining whether the filtered set of image data is sufficient for reconstruction of a 3D model of the asset; and
reconstructing the 3D model based on the filtered set of image data upon determining that the filtered set of image data is sufficient for reconstruction of the 3D model.

13. The image analysis system of claim 12, wherein the one or more non-tangible, processor executable routines, when executed by the one or more processors, cause further acts to be performed comprising:
upon determining that the filtered set of image data is insufficient for reconstruction of the 3D model:
updating the flight plan to generate an updated flight plan, wherein the updated flight plan comprises a set of supplemental geometric poses that facilitates acquisition of one or more additional sets of image data of sub-regions of the asset via the one or more drones.

14. The image analysis system of claim 13, wherein the sub-regions are indicative of points along the asset determined to be imaged from less than a minimum number of different perspectives in the filtered set of image data.

15. The image analysis system of claim 13, wherein the one or more non-tangible, processor executable routines, when executed by the one or more processors, cause further acts to be performed comprising:
reconstructing the 3D model based on the filtered set of image data and the one or more additional sets of image data upon determining that the filtered set of image data combined with the one or more additional sets of image data is sufficient for reconstruction of the 3D model.

16. The image analysis system of claim 12, wherein the one or more non-tangible, processor executable routines, when executed by the one or more processors, cause further acts to be performed comprising:
upon determining that the filtered set of image data is insufficient for reconstruction of the 3D model:
adjusting one or more camera operational parameters;
acquiring one or more additional sets of image data of sub-regions of the asset by having the one or more drones re-execute the flight plan or execute an updated flight plan; and
generating the one or more additional sets of image data using the adjusted camera operational parameters.

17. The image analysis system of claim 12, wherein sufficiency of the filtered set of image data is determined in view of the 3D model generated using the filtered set of image data.

* * * * *